(12) United States Patent
Veda et al.

(10) Patent No.: US 12,386,376 B2
(45) Date of Patent: Aug. 12, 2025

(54) SYSTEM AND METHOD FOR A CHARGING STATION

(71) Applicant: Transportation IP Holdings, LLC, Norwalk, CT (US)

(72) Inventors: Santosh Sambamoorthy Veda, Niskayuna, NY (US); Robert Dean King, Schenectady, NY (US); Irene Michelle Berry, Niskayuna, NY (US); Zhi Zhou, Bethlehem, NY (US); Matthew Christian Nielsen, Niskayuna, NY (US); Lembit Salasoo, Niskayuna, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 722 days.

(21) Appl. No.: 17/556,598

(22) Filed: Dec. 20, 2021

(65) Prior Publication Data

US 2022/0163990 A1    May 26, 2022

Related U.S. Application Data

(63) Continuation-in-part of application No. 16/452,102, filed on Jun. 25, 2019, now Pat. No. 11,231,733, (Continued)

(51) Int. Cl.
*G05F 1/70* (2006.01)
*G05F 1/66* (2006.01)
(Continued)

(52) U.S. Cl.
CPC ............... *G05F 1/70* (2013.01); *G05F 1/66* (2013.01); *G06F 1/26* (2013.01); *G06Q 50/06* (2013.01);
(Continued)

(58) Field of Classification Search
CPC .... G05F 1/66; G05F 1/70; G06F 1/26; G06Q 50/06; H02J 3/003; H02J 3/008;
(Continued)

(56) References Cited

U.S. PATENT DOCUMENTS 3,940,687 A    2/1976    Akhundov et al.
4,888,674 A    12/1989    Weibelzahl et al.
(Continued)

FOREIGN PATENT DOCUMENTS

CN    2123826 U    12/1992
CN    2666010 Y    12/2004
(Continued)

OTHER PUBLICATIONS

Notification of Reasons for Refusal, dated Apr. 16, 2019 for corresponding JP Patent Application No. 2016-571373.
(Continued)

*Primary Examiner* — Crystal J Barnes-Bullock
(74) *Attorney, Agent, or Firm* — K&L Gates LLP

(57) ABSTRACT

A system is provided having one or more charging stations that are electrically coupled with a power distribution grid and that may selectively couple with one or more energy storage devices; and a controller that may control transfer of electric power between the one or more charging stations, the one or more energy storage devices, and the power distribution grid. The controller may determine the amount of electric power transferred based at least in part on one or more assessment values.

11 Claims, 5 Drawing Sheets

Related U.S. Application Data which is a continuation of application No. 15/319,501, filed as application No. PCT/US2015/036940 on Jun. 22, 2015, now Pat. No. 10,520,966.

(60) Provisional application No. 62/014,793, filed on Jun. 20, 2014, provisional application No. 62/014,807, filed on Jun. 20, 2014.

(51) Int. Cl.

| | |
|---|---|
| *G06F 1/26* | (2006.01) |
| *G06Q 50/06* | (2012.01) |
| *H02J 3/00* | (2006.01) |
| *H02J 3/16* | (2006.01) |
| *H02J 3/32* | (2006.01) |
| *H02J 3/38* | (2006.01) |
| *H02J 3/48* | (2006.01) |
| *H02J 3/50* | (2006.01) |
| *H02J 7/02* | (2016.01) |
| *H02J 13/00* | (2006.01) |
| *H02J 3/12* | (2006.01) |

(52) U.S. Cl.
CPC .......... *H02J 3/008* (2013.01); *H02J 3/16* (2013.01); *H02J 3/322* (2020.01); *H02J 3/388* (2020.01); *H02J 3/48* (2013.01); *H02J 3/50* (2013.01); *H02J 7/02* (2013.01); *H02J 13/00* (2013.01); *H02J 13/00016* (2020.01); *H02J 3/003* (2020.01); *H02J 3/12* (2013.01); *Y02B 70/30* (2013.01); *Y02B 90/20* (2013.01); *Y02E 40/70* (2013.01); *Y02E 60/00* (2013.01); *Y02P 80/10* (2015.11); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/123* (2013.01); *Y04S 10/50* (2013.01); *Y04S 20/12* (2013.01); *Y04S 20/221* (2013.01); *Y04S 30/12* (2013.01); *Y04S 50/10* (2013.01)

(58) Field of Classification Search
CPC ...... H02J 3/12; H02J 3/16; H02J 3/322; H02J 3/388; H02J 3/48; H02J 3/50; H02J 7/02; H02J 13/00016
See application file for complete search history.

(56) References Cited

U.S. PATENT DOCUMENTS

| | | | |
|---|---|---|---|
| 5,422,561 A | 6/1995 | Williams et al. | |
| 5,535,113 A | 7/1996 | Konishi | |
| 5,610,501 A | 3/1997 | Nelson et al. | |
| 7,508,173 B2 | 3/2009 | Zhou et al. | |
| 8,154,246 B1 | 4/2012 | Heitmann et al. | |
| 9,026,347 B2 | 5/2015 | Gadh et al. | |
| 9,071,082 B2 | 6/2015 | Nishibayashi et al. | |
| 9,348,381 B2 | 5/2016 | Khoo et al. | |
| 9,368,970 B2 | 6/2016 | Nishibayashi et al. | |
| 10,520,966 B2 | 12/2019 | Veda et al. | |
| 10,693,294 B2 | 6/2020 | Kearns et al. | |
| 11,034,255 B2 | 6/2021 | Ben David et al. | |
| 11,231,733 B2 | 1/2022 | Veda et al. | |
| 11,427,103 B2 * | 8/2022 | Brombach | H02J 7/00 |
| 2010/0079004 A1 | 4/2010 | Keefe | |
| 2010/0082464 A1 | 4/2010 | Keefe | |
| 2010/0109445 A1 | 5/2010 | Kurs et al. | |
| 2012/0086220 A1 | 4/2012 | Abdel-Baqi et al. | |
| 2012/0193984 A1 | 8/2012 | Krok et al. | |
| 2012/0197450 A1 | 8/2012 | Krok et al. | |
| 2012/0197454 A1 | 8/2012 | Krok et al. | |
| 2012/0203384 A1 | 8/2012 | Arlaban Gabeiras et al. | |
| 2013/0030579 A1 | 1/2013 | Milosevic et al. | |
| 2013/0030598 A1 | 1/2013 | Milosevic et al. | |
| 2013/0030599 A1 | 1/2013 | Milosevic et al. | |
| 2013/0110296 A1 | 5/2013 | Khoo et al. | |
| 2013/0179061 A1 | 7/2013 | Gadh et al. | |
| 2013/0206490 A1 | 8/2013 | Kouvo et al. | |
| 2014/0012446 A1 | 1/2014 | Kumar et al. | |
| 2014/0084685 A1 | 3/2014 | Bienfang et al. | |
| 2014/0088781 A1 | 3/2014 | Kearns et al. | |
| 2015/0069970 A1 | 3/2015 | Sarkar et al. | |
| 2015/0301546 A1 | 10/2015 | Homor | |
| 2015/0328999 A1 * | 11/2015 | Dureau | B60L 55/00 |
| | | | 320/109 |
| 2015/0355284 A1 | 12/2015 | Prada et al. | |
| 2018/0018007 A1 | 1/2018 | Dorn et al. | |
| 2021/0203177 A1 | 7/2021 | Peng | |
| 2021/0218249 A1 | 7/2021 | Dong et al. | |

FOREIGN PATENT DOCUMENTS

| | | | | |
|---|---|---|---|---|
| CN | 201562974 U | | 8/2010 | |
| CN | 201682288 U | | 12/2010 | |
| CN | 102157937 A | | 8/2011 | |
| CN | 202103433 U | | 1/2012 | |
| CN | 202134922 U | | 2/2012 | |
| CN | 202364132 U | | 8/2012 | |
| CN | 202405792 U | | 8/2012 | |
| CN | 102025182 B | * | 10/2012 | |
| CN | 102934319 A | | 2/2013 | |
| CN | 103107548 A | | 5/2013 | |
| CN | 103268136 A | | 8/2013 | |
| CN | 103298644 A | | 9/2013 | |
| CN | 103414202 A | * | 11/2013 | |
| CN | 102842914 B | * | 4/2015 | |
| CN | 107122924 A | * | 9/2017 | ......... G06Q 10/0639 |
| CN | 108011386 A | * | 5/2018 | |
| CN | 106660461 B | * | 8/2019 | ............... G05F 1/66 |
| DE | 202022103641 U1 | * | 11/2023 | |
| EP | 1410655 A0 | | 4/2004 | |
| EP | 2375561 A1 | * | 10/2011 | ................ F03D 9/11 |
| GB | 201007246 | | 6/2010 | |
| JP | H0282595 A | | 3/1990 | |
| JP | 2006109621 A | | 4/2006 | |
| JP | 2010246368 A | | 10/2010 | |
| JP | 2012154024 A | | 8/2012 | |
| JP | 2012175722 A | | 9/2012 | |
| JP | 2012249505 A | | 12/2012 | |
| JP | 2013041324 A | | 2/2013 | |
| JP | 2013099140 A | | 5/2013 | |
| JP | 2013515888 A | | 5/2013 | |
| JP | 2013172488 A | | 9/2013 | |
| JP | 5396549 B1 | | 1/2014 | |
| JP | 2014011860 A | * | 1/2014 | |
| JP | 6062682 B2 | * | 1/2017 | ............. B60L 53/51 |
| KR | 20120034428 A | * | 4/2012 | |
| KR | 20120076629 A | * | 7/2012 | |
| WO | 9618937 A1 | | 6/1996 | |
| WO | 2010143628 A1 | | 12/2010 | |
| WO | 2012119300 A1 | | 9/2012 | |
| WO | WO-2014014259 A1 | * | 1/2014 | .......... B60L 11/1816 |
| WO | 2014083239 A1 | | 6/2014 | |
| WO | 2015196193 A1 | | 12/2015 | |

OTHER PUBLICATIONS

English translation of the "Notification of Reasons for Refusal" dated Apr. 16, 2019 for corresponding JP Patent Application No. 2016-571373.
ISR/WO of International Publication No. WO2012/119300 (Chinese Application No. CN2011071567).
ISR/WO of International Publication No. 2013-515888.
Machine translation and Copy of First office action and search issued in connection with corresponding CN Application No. 201580044651.3 on Sep. 4, 2018.
Grainger et al., "VolWar Control On Distribution Systems with Lateral Branches Using Shunt Capacitors and Voltage Regulators Part I: The Overall Problem", IEEE Transactions Power Apparatus and Systems, vol. No. PAS-104, Issue No. 11, pp. 3278-3283, Nov. 1985.

(56) References Cited

OTHER PUBLICATIONS

Deng et al., "A Heuristic and Algorithmic Combined Approach for Reactive Power Optimization with Time-Varying Load Demand in Distribution Systems", IEEE Transactions on Power Systems, vol. No. 17, Issue No. 4, pp. 1068-1072, Nov. 2002.

Kinjo et al., "Output Levelling of Renewable Energy by Electric Double-Layer Capacitor Applied for Energy Storage System", IEEE Transactions on Energy Conversion, vol. No. 21, Issue No. 1, pp. 221-227, Mar. 2006.

Mundackal et al., "Grid Power Quality Improvement And Battery Energy Storage in Wind Energy Systems", International Conference on Microelectronics, Communications and Renewable Energy (ICMiCR), pp. 1-6, Jun. 4-6, 2013.

Search Report and Written Opinion in connection with corresponding PCT Application No. PCT/US2015/036940 on Sep. 24, 2015.

\* cited by examiner

SYSTEM AND METHOD FOR A CHARGING STATION

CROSS-REFERENCE TO RELATED APPLICATIONS

This application may be a continuation-in-part of U.S. patent application Ser. No. 16/452,102 (filed 25 Jun. 2019), which may be a continuation of U.S. patent application Ser. No. 15/319,501 (filed 16 Dec. 2016), which may be a national stage application filed under 35 U.S.C. § 371(c) of prior filed PCT application number PCT/US2015/036940 (filed 22 Jun. 2015), which claims the benefit of U.S. Provisional Application No. 62/014,807 (filed 20 Jun. 2014) and U.S. Provisional Application No. 62/014,793 (filed 20 Jun. 2014). The above-listed applications may be incorporated herein by reference in their entireties.

BACKGROUND

Technical Field

Embodiments of the invention relate to a method and system for charging electric vehicles and/or managing electric distribution networks.

Discussion of Art

Electric vehicles may use one or more traction motors for propulsion. In these vehicles, electrical energy may be stored in on-board energy storage units. Energy storage units may be batteries and ultracapacitors. The energy may be fed to an inverter where direct current (DC) may be converted to alternating current (AC). The AC may be then fed to multi-phase (typically 3-phase) AC motors that drive the wheels of the vehicle. Electric propulsion may be becoming increasingly common in material transport vehicles, including underground mining vehicles, replacing diesel powered vehicles in the interest of complying with environmental and safety regulations, lowering emissions and improving mine air conditions.

These vehicles, however, require periodic charging of the on-board energy storage units. While some electric vehicles utilize removable battery packs that may be swapped out when they reach a low state of charge, other electric vehicles have energy storage units that may be permanently affixed to the vehicle, and which require a connection to a supply of electrical power for recharging. As such, there may be a need, therefore, for a charging station that may be connected to the power distribution system of a mine and receives a supply of electrical power therefrom, and that interfaces with one or more electric mining vehicles to quickly and safely recharge the on-board energy storage units.

In connection with the above, operating in underground and surface mines presents unique challenges from a power supply standpoint. Mines may be outfitted with a power distribution system connected to the main power grid and/or local power generating equipment, which supplies power for lighting, ventilation equipment, mining equipment and machinery, and the like. For example, the power distribution system may be commonly used to supply power to dragline excavators, power shovels (e.g., electric mining shovels), continuous miners and other machinery or electrical devices, which may be known to present large electrical loads.

Indeed, with many of the loads on the distribution system being large motor loads, there may be often large inrush currents during startup. In addition to large load swings, these loads can create large step changes when they may be turned off or on. When the power distribution grid may be weak, such as where the grid may be connected to the main grid by long transmission lines or may be part of a microgrid, the ability of the grid to manage these large load steps within the required time may be significantly lesser, leading to grid instability. Even in strongly connected grids, such large load swings may be unfavorable for normal grid operation and could lead to nuisance tripping of protective devices and excessive wear and tear on electrical equipment. It may be desirable to have systems and methods that differ from those that are currently available.

BRIEF DESCRIPTION OF THE INVENTION

In one embodiment, a system is provided having one or more charging stations that are electrically coupled with a power distribution grid and that may selectively couple with one or more energy storage devices; and a controller that may control transfer of electric power between the one or more charging stations, the one or more energy storage devices, and the power distribution grid. The controller may determine the amount of electric power transferred based at least in part on one or more assessment values.

In one embodiment, a method is provided that includes controlling transfer of electric power between one or more charging stations, one or more energy storage devices, and a power distribution grid that is electrically coupled to the one or more charging stations, and the one or more energy storage devices being disposed on a vehicle. The method further includes charging or discharging, selectively, one or more energy storage devices via the one or more charging stations, and scheduling one or times that the vehicle can supply to or draw from the power distribution grid the electric power via the one or more charging stations, and thereby to obtain a scheduled time. The method continues by determining a draw magnitude to or from the power distribution grid via the one or more charging stations. Active power, reactive power, or both active and reactive power of the electric power may be controlled based at least in part on the scheduled time and the draw magnitude.

A method of power control for a charging station is provided that includes conducting an assessment of electrical loads on a power distribution grid, the power distribution grid being electrically coupled to the charging station. The method includes determining an available capacity of an energy storage device that is connected to the charging station to provide active power support, reactive power support, or both, to the power distribution grid. The method further includes selecting one or more types of power control to be carried out. A power dispatch command may be issued to the charging station to provide active power support, reactive power support, or both, to the power distribution grid, and the power dispatch command being based at least in part on the determined available capacity of the energy storage device.

BRIEF DESCRIPTION OF THE DRAWINGS

The invention may be understood from reading the following description of non-limiting embodiments, with reference to the attached drawings, wherein below.

Reference will be made below in detail to exemplary embodiments of the invention, examples of which may be illustrated in the accompanying drawings. Wherever possible, the same reference numerals used throughout the drawings refer to the same or like parts.

DETAILED DESCRIPTION

Figure 1:
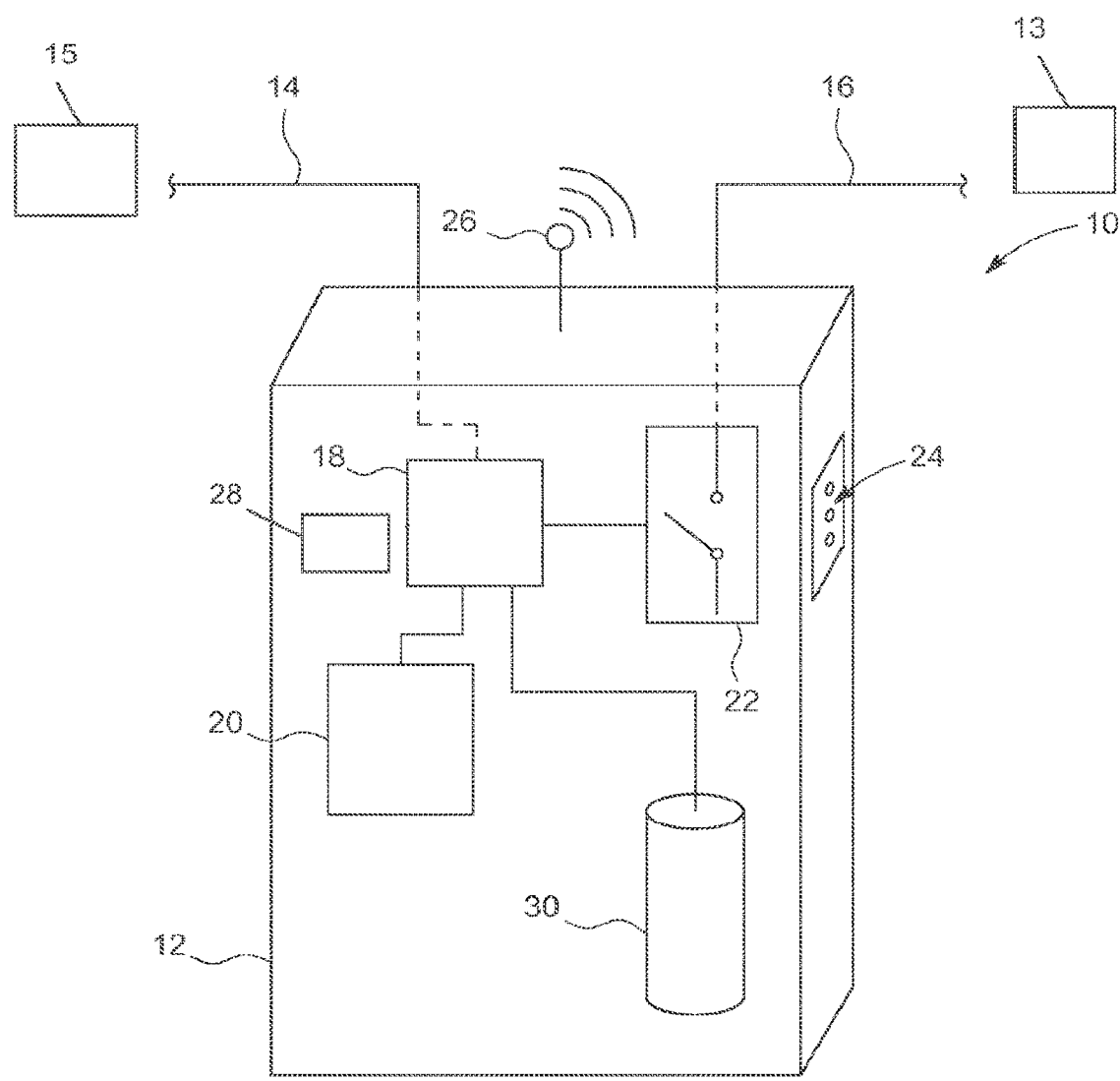
FIG. 1 may be schematic illustration and block diagram of a charging module, according to an embodiment of the invention.

Embodiments of the invention relate to a method and system for charging electric vehicles and/or managing electric distribution networks. In one embodiment, one or more charging stations are electrically coupled with a power distribution grid and selectively couple with one or more energy storage devices. A controller may control transfer of electric power between the one or more charging stations, the one or more energy storage devices, and the power distribution grid. The controller may determine the amount of electric power transferred based at least in part on one or more assessment values.

With regard to the assessment value, it may be based on one or more of a load assessment, capacity assessment, reactive capacity assessment, voltage assessment, and reactive power assessment. A suitable assessment value may be a real-time reactive power assessment of the power distribution grid, and the electric power supplied to the power distribution grid is reactive power. In one example, the controller may determine the amount of electric power to be transferred to or from the power distribution grid and the energy storage device based at least in part the assessment value.

The controller may generate one or more control signals based on both of i) a measured transfer time that one or more electric machines that are selectively couplable to the one or more charging stations are scheduled to transfer electrical power back to the power distribution grid, and ii) one or more transfer magnitudes of the electrical power to be transferred back to the power distribution grid from the electric machines. The controller may conduct a real-time load assessment of the power distribution grid based on at least one of a voltage measurement or a current measurement of the electrical power associated with the power distribution grid. The controller may responsively generate the control signal further based on the load assessment. In one embodiment, the controller may determine a capacity of the one or more charging stations to transfer the electric power to the power distribution grid based at least in part on one or more charging profiles of the energy storage devices; and may generate the control signal based on the capacity that is determined.

Each charging station may include a respective local control unit configured to receive the control signal from the centralized control unit and to control the transfer of the electric power to the power distribution grid based at least in part on the control signal.

In one embodiment, the assessment value is a real-time reactive power assessment of an electric vehicle having one or more traction motors. The one or more energy storage devices may be disposed on the vehicle. The controller may determine the amount of electric power to be transferred from the power distribution grid to the energy storage device based at least in part the assessment value. Alternatively or additionally, the controller may direct reactive power support to the power distribution grid based at least in part the assessment value.

The controller may switch between a first mode and a second mode. In the first mode the controller causes at least one of the charging stations to supply active power to the power distribution grid, and in the second mode the controller causes at least one of the charging stations to provide reactive power to the power distribution grid, a mode determination of the controller being responsive to at least the assessment value.

An embodiment of the invention provides a method that includes controlling transfer of electric power between one or more charging stations, one or more energy storage devices, and a power distribution grid that is electrically coupled to the one or more charging stations, and the one or more energy storage devices being disposed on a vehicle. The method continues by charging or discharging, selectively, one or more energy storage devices via the one or more charging stations. One or times that the vehicle can supply to or draw from the power distribution grid the electric power via the one or more charging stations may be scheduled to obtain a scheduled time. A draw magnitude to or from the power distribution grid via the one or more charging stations may be determined. And, active power, reactive power, or both active and reactive power of the electric power may be controlled based at least in part on the scheduled time and the draw magnitude.

The method may include determining one or more transfer times for the vehicle based at least in part on the scheduled time and on the draw magnitude. A control signal based at least in part on at least one of the transfer time, the scheduled time, and the draw magnitude may be generated.

In one embodiment, a method of power control for a charging station is provided. The method may include conducting an assessment of electrical loads on a power distribution grid, the power distribution grid being electrically coupled to the charging station. An available capacity of an energy storage device that is connected to the charging station to provide active power support, reactive power support, or both, to the power distribution grid may be determined. one or more types of power control to be carried out may be selected. And, a power dispatch command may be issued to the charging station to provide active power support, reactive power support, or both, to the power distribution grid, and the power dispatch command being based at least in part on the determined available capacity of the energy storage device.

The energy storage device may be one of a plurality of energy storage devices and the charging station may be one of a plurality of charging stations that may couple to the power distribution grid. The total available capacity may be determined by summing the individual capacities of all of the plurality of energy storage devices electrically connected to the power distribution grid through one of the plurality of charging stations. In one embodiment, conducting the assessment of electrical loads on the power distribution grid may include one or more of a load assessment, capacity assessment, reactive capacity assessment, voltage assessment, and reactive power assessment. The power control type selection may be based at least in part on the assessment. The assessment may be conducted in real-time. In one embodiment, the assessment is a projection or model, rather than a measurement. And, the assessment may be prognosticated such that vehicles (with their capacities) may be proactively added or removed from the electrical connection to achieve a desired capacity level relative to the predicted need. A suitable assessment is based at least in part on a charging profile, load cycle profile, asset information, and status of the energy storage device or plural devices.

Turning to FIG. 1, an electric vehicle charging module 10 according to an embodiment of the invention is illustrated. As shown therein, the charging module includes a rectangular housing 12. A suitable housing may be an enclosure formed from plastic or metal. A suitable metal may be aluminum or steel. In an embodiment, the housing may be an explosion-proof enclosure. The module may electrically connect to a supply of AC power by supply line 14 and includes a charge line 16 for connection to an electric vehicle 13 to recharge the same. In an embodiment, the supply line connects the module to the power distribution system/network 15 within a working area. Suitable working areas may include mines, yards, lots, and other determined and bounded locations. The network may be connected to the main power grid and/or local power generating equipment. In an embodiment, the charge line may be a conductive line capable of transmitting electrical power from the charging module to a coupled electric vehicle or equipment. In other embodiments, the charge line may be replaced by a wireless means of transferring AC power to the electric vehicle.

With further reference to FIG. 1, the electric vehicle charging module includes a variety of system blocks having specific targeted functions such as electrical safety, communications, controls and the like. As used herein, "block" means specific component(s) and/or device(s) that may perform targeted functions. In particular, the charging module includes a control block 18, a communications block 20, an electrical switch 22, a LED array 24 and a network communications device 26. In an embodiment, the control block includes a control unit 28 for controlling operational aspects of the system. The control block may include a control board having an array of circuit breakers, positive temperature coefficient (PTC) materials, ferrite beads, fuses, and the like (not shown). These operational aspects may include, for example, the distribution of electrical energy from the charging station to a connected electric vehicle or equipment. Other operational aspects may include ground fault protection and overload protection monitoring and may include combinations of components. The control block may protect the charging module and the connected vehicle(s) from electrical damage. The control block may monitor the current, voltage, and thermal limits of the wires and electrical components. The control block may monitor the apparent power (VA), real power (Watts), and/or reactive power (VAR) of the system. In some embodiments, magnetic loads, such as motors, can draw more VA power than actual real power. The extra component is reactive power. VAR addresses magnetic power, which may cause a phase shift between voltage and current curves.

The control block may enforce limits on the current provided to, or through, the wires, cables, and/or power lines that may restrict how much energy is transferred between vehicles or between the vehicle(s) and the grid(s) as an active control. As a passive control, the system can include a positive temperature coefficient (PTC) material along the conductive pathways between the vehicles and/or between the grid(s) and the vehicles. This PTC material can have a resistance or resistivity that changes with temperature. For example, the material can have an increasing resistance to electric current as the temperature of the material increases. This can reduce, limit, or otherwise control the conduction of current when the temperature of the material and/or ambient environment is elevated. The charging connection may include a surge protector. The surge protector may be an active surge protector or a passive surge protector. The passive surge protector may include ferrite beads and/or rings.

In an embodiment, the communications block may establish a communications link with the electric vehicle to be charged. The purpose of such communications link may be to provide a high bandwidth link to the vehicle in order to exchange operational information. In an embodiment, the communication between the communications block and the vehicle (not shown) may be a wired communication, although other types of communication such as wireless may be envisioned. Operational information may include health monitoring data, uploads of operational system software/firmware, and/or logistics information related to vehicle performance within a working area. The communications link of the communications block may be utilized to identify the presence of the suitable vehicle or equipment and to assess the maximum current draw that can be provided through the charging module to the coupled vehicle at the time.

The electrical switch may be responsible for the basic ON/OFF switching of the AC power to or from the electric vehicle. In particular, the switch can be selectively transitioned from a first state, in which AC electrical power may be prevented from flowing from the charging module to a connected electric vehicle, and a second state, in which AC electrical power may be permitted to flow from the charging module to a connected electric vehicle to charge the vehicle. In an embodiment, the electrical switch may be a contactor. In an embodiment, the electrical switch may automatically transition to the second state when an electrical communication between the charging module and a vehicle may be established. In other embodiments, the electrical switch may be manually activated.

As shown in FIG. 1, the LED array may include a plurality of different LEDs capable of conveying operating information and charging status to a user. For example, the LED array may convey whether or not the module may be functioning properly or may be in a fault state, and whether or not vehicle charging may be complete or ongoing.

The network communications device, as shown in FIG. 1, may be selected to provide a communications pathway into the working area from a remote location outside of the working area. For example, the communications device may be a wireless transceiver capable of transmitting and/or receiving information over VHF or UHF (for existing leaky feeder systems). In other embodiments, the network communications device provides for communication between the charging module and a remote location over WiFi. In connection with the above, the network communications device may have an array of components that provide the above-described communications functionality.

The control unit of the control block may control the distribution of electrical energy from the charging station to a connected electric vehicle or equipment. Accordingly, in an embodiment, the control block may operate according to a control algorithm stored in memory, and in dependence upon information about the vehicle or equipment received from the communications block, to execute a charge routine specific to the vehicle or energy storage units to be charged. Moreover, the control unit may respond to SCADA commands to throttle charging or pause/suspend charging.

With reference to FIG. 1, the charging module may include an energy storage device 30. A suitable energy storage device can selected from one or more of batteries, ultracapacitors, and the like, based at least in part on application specific parameters. For convenience, the term energy storage device may be used interchangeably with the term battery unless context dictates otherwise. The energy storage device may be charged using the supply of electrical power received by the module via supply line, in one embodiment. The energy storage device may release stored electrical energy to a connected vehicle or equipment under control of the control unit to supplement the primary supply of electrical energy coming from the main supply line. Accordingly, the energy storage device may function as a buffer to reduce the overall peak load that would otherwise be placed on the working area's electric grid infrastructure.

Figure 2:
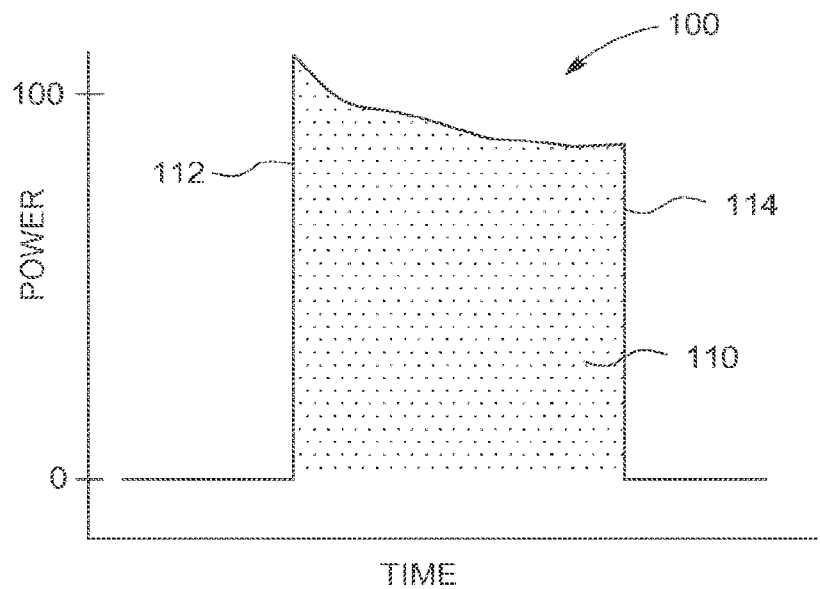
FIG. 2 may be a graph illustrating a charge profile during charging of an electric vehicle without the use of a supplemental battery energy storage device.
Figure 3:
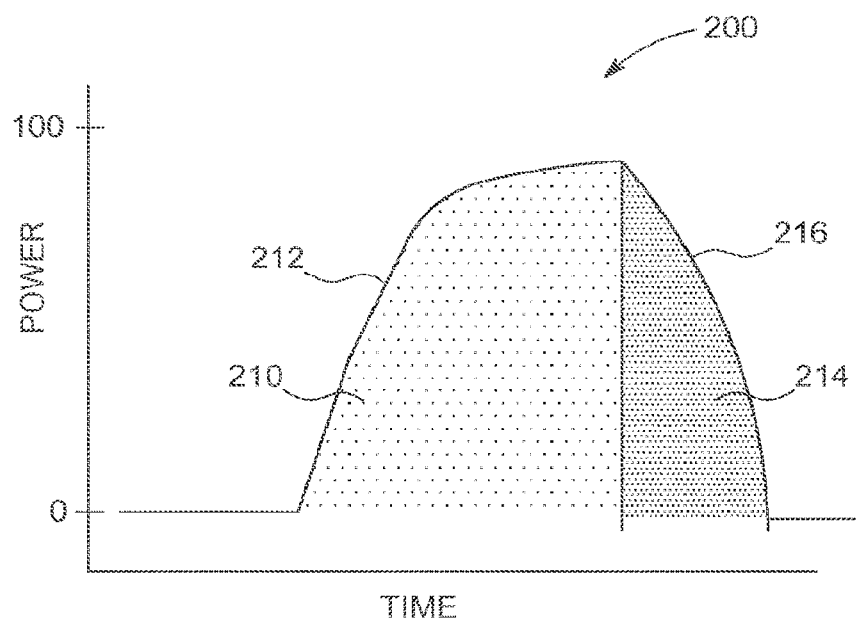
FIG. 3 may be a graph illustrating a charge profile during charging of an electric vehicle utilizing the charging module of FIG. 1 having a supplemental battery energy storage device.

With reference to FIGS. 2 and 3, the 'smoothing' effect of the battery energy storage device may be shown. In particular, FIG. 2 may be a graph 100 illustrating the power draw on a working area's electric grid during charging (represented by area 110 under the charge profile curve) of an electric vehicle utilizing the charging station not having a supplemental battery energy storage device. As illustrated therein, there may be a large, instantaneous jump in power draw at the moment 112 charging commences, and a large, instantaneous drop in power draw at the moment 114 charging may be finished or terminated. Large, spikey transient power flows during vehicle/equipment charging may increase the stress on upstream electrical grid components and may decrease the integrity of the working area's electrical power distribution system, as a whole.

FIG. 3 shows a graph 200 illustrating the smoothing effect of the supplemental battery energy storage device of the charging module. Charging of a connected electric vehicle or other piece of machinery of equipment may be represented by area 210. As shown therein, the battery energy storage device, by supplying supplemental power in addition to the primary power from the supply line, functions to smooth the edges of the charge profile. In particular, when a vehicle may be connected to the charging module, the battery energy storage device provides supplemental electrical energy to prevent such a large, instantaneous draw on the working area's electrical grid, as evidenced by the slope of line 212. Moreover, upon completion of charging, the battery energy storage device may be recharged automatically (represented by area 214), which functions to prevent an instantaneous drop-off in power draw by the charge module. As shown therein, recharging the battery energy storage device upon completion of charging of the electric vehicle functions to smooth the curve at the back end of the charge profile, as evidenced by line 216.

Thus, the charging module described herein provides for the tailored and controlled charging of electric vehicles and equipment while minimizing the impact on the larger power grid, such as a power distribution grid within a working area.

The module may be a self-contained unit that may be low cost to manufacture and may be portable such that it can be selectively positioned within a working area. The module may be robust enough so as to withstand the harsh underground environment of an underground mine and may be explosion-proof such that it may be rated for use in coal-mining applications. As discussed above, the module includes an integrated battery energy storage system that helps to smooth the power profile of the charging module, and which helps the upstream electrical grid components handle the large, spikey transient power flows created by the electric vehicles during charging.

Figure 4:
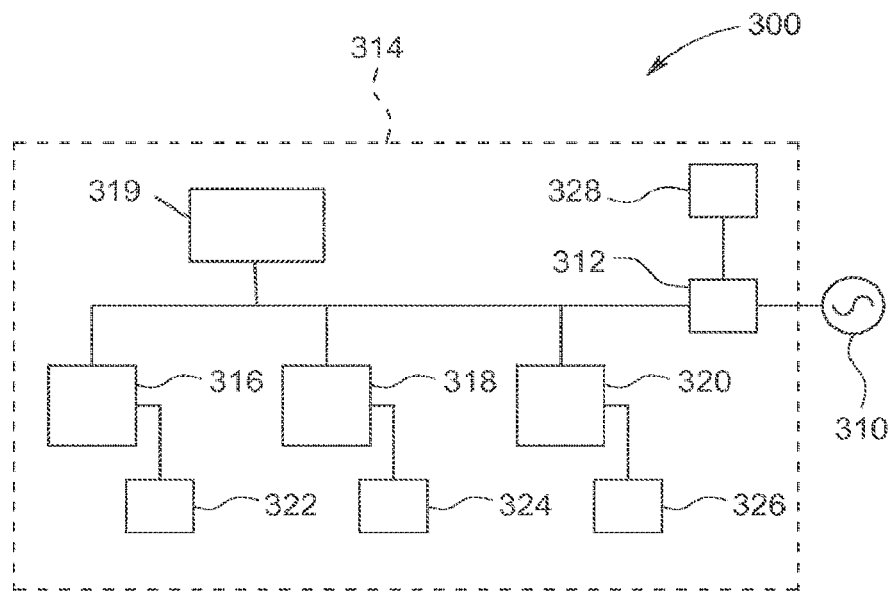
FIG. 4 may be a schematic diagram of a system for controlling the active power from an energy storage charging station, according to an embodiment of the invention.

Referring now to FIG. 4, in an embodiment, a system 300 for controlling the active power from one or more network charge modules may be provided. By controlling the active power from the charge modules, the system may provide grid support to the power distribution system of a working area, as discussed hereinafter. While system may be described hereinafter as being integrated with a power distribution system within a working area, system may provide active power support to an electrical grid or microgrid for an installation or other infrastructure. The system, therefore, may be not be a mining applicable system.

As shown in FIG. 4, the system includes a main power grid 310 (and/or local power generating equipment) which provides a supply of electrical power to the local power distribution system 312 for a working area, which are operably disposed in a mine or other facility 314 where electric machines 319 are operated. As discussed above, the local power distribution system may contain a network of cables that supply power to lights, ventilation equipment, mining machinery and equipment, and the like. For example, as shown in FIG. 4, the local power distribution system may supply power to one or more electric vehicle charging stations 316, 318, 320. The charging stations may be selectively connected to rechargeable energy storage devices of electric vehicles or machinery in order to selectively recharge the same. Suitable connections may include a wired plug, a catenary, a third rail, and a wireless power transfer device. For some connection configurations, electric power may be transferred while the vehicle is in motion such that the vehicle's traction motors may consume and/or supply (in regenerative braking mode) electric power, and may create a substantial electromagnetic signature. The electric power and the magnetic component may be variable, and may swing rapidly, and with a great magnitude.

As shown in FIG. 4, the system may include a control unit 328 that communicates with power grid and the charging stations. The control unit may further communicate with a local power distribution system, and it may be a communicative link between various items of equipment and the charging stations. In an embodiment, the control unit may be a centralized control unit that may be located locally within the working area or remote from the working area. In other embodiments, the control unit may be a local control unit housed within one of the charging stations. In other embodiments, the control unit may be plural coordinated control units, each housed within a respective one of the charging stations.

Figure 5:
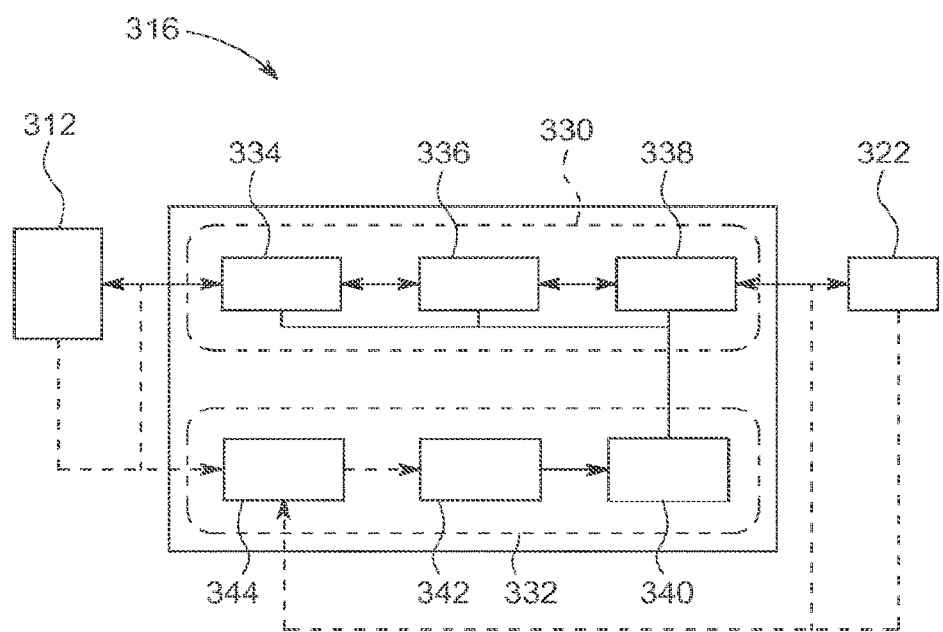
FIG. 5 may be a schematic illustration and block diagram of a charging station of the system of FIG. 4, according to an embodiment of the invention.

In an embodiment, each of the charging stations may be a charge module and may selectively charge the energy storage device on-board an electric vehicle or machinery (not shown). With reference to FIG. 5, the internal architecture of an exemplary charging station is shown. As illustrated therein, the charging station includes a power conversion block 330 containing power conversion circuitry, and a control block 332 containing control circuitry. The power conversion block may be electrically connected at an input end to the power distribution system/network of the working area, and to the electric vehicle battery at an output end, and includes a converter 334, a driver 336 and a DC/DC converter 338. The control block includes an interface 340, a local control unit 342 and sensing circuitry 344. The control unit may be electrically coupled to, and may control, the components of the power conversion block through the interface.

As shown in FIG. 5, the sensing circuitry may be in communication with, and receives information from, the vehicle battery and from the distribution network and relays this information to the local control unit. In addition, the sensing circuitry monitors the flow of electrical power from the distribution network to the charging station, as well as to the distribution network from the charging station, and the flow of electrical power from the charging station to the vehicle battery, as well as to the charging station from the vehicle battery. The information may be communicated to the local control unit and, subsequently, to the centralized control unit to control the network of charging stations.

Figure 6:
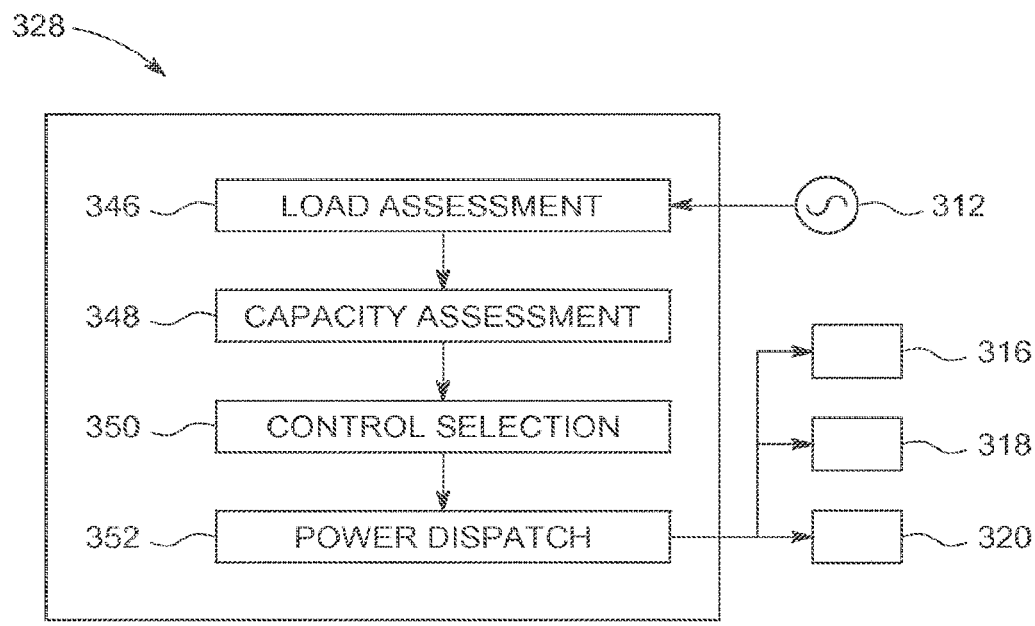
FIG. 6 may be a block diagram of a control unit of the system of FIG. 4, according to an embodiment of the invention.

Turning now to FIG. 6, an example control architecture of the control unit is illustrated. As shown therein, the control unit includes a load assessment block 346, a capacity assessment block 348, a selection block 350 and a dispatch block 352.

The control unit, through the load assessment block, may determine the actual or expected load on the distribution network as a result of the starting up, shutting down and continued operation of mining equipment and machinery, as well as whether the power supplied by the network may be capable of adequately meeting the load requirements. In particular, the control unit may conduct a real-time load assessment in dependence upon a plurality of load assessment parameters. In an embodiment, the load assessment parameters may include one or more of a measured voltage, current, power and frequency of the electrical supply from the distribution grid, historical load data and a network model.

In an embodiment, the historical load data and network model may be representative of the number and size of actual and expected electrical loads within the working area and may include data relating to actual and expected inrush currents and step changes during startup and shutdown of working area machinery and systems. In an embodiment, historical data may be the instantaneous value of voltage, current, frequency and power of individual electric equipment including, but not limited to, generators or loads, or of aggregated measurements at common measurement points such as feeder heads or junction boxes.

The control unit, through the capacity assessment block 348, may determine the capacity of the network charging stations to provide active power support to the power distribution network. In particular, the control unit may determine the capacity of the charging stations to provide active power grid support in dependence upon a plurality of capacity assessment parameters/information received from each of the charging stations. In an embodiment, the capacity assessment parameters may include information and data relating to the charging profiles of batteries 322, 324, 326 (and their associated electric vehicles) connected to the charging stations, respectively, load cycle profiles, asset information, the status of each of the batteries, and/or concept of operations for the different electric vehicles.

With further reference to FIG. 6, the control unit, in the selection block 350, may select the type of control/grid support to be performed by the system utilizing the charging stations, or a combination of active power controls, where feasible. In an embodiment, the type of control/support may include load ramp regulation, generator ramp regulation and frequency regulation. In addition, the control unit may control the charging stations to provide supplemental reserve power support and/or emergency power support, as discussed in detail below. In an embodiment, certain active power control can be prioritized over others during the control selection depending on the current operating condition or as determined by the operator or another control logic.

Moreover, through the power dispatch block 352, the control unit may issue a command to one or more of the charging stations to provide the particular type of support selected by selection block 350. In an embodiment, the command includes a active power set point that may be communicated to the local control unit of one or more of the charging stations.

In operation, in order to provide active power support to the power distribution network, control unit first conducts a real-time load assessment in dependence upon one or more of voltage, power, frequency and/or current measurements of the electrical supply from the main grid 310 to the distribution network, historical load data for the network, and a network model. The control unit then determines which charging stations have batteries connected to them (and may be thus able to provide active power), and the capacity of such charging stations to provide active power in dependence upon the charging profiles of the batteries, load cycle profiles, asset information and the status of each of the batteries. Once capacity has been determined, the control unit selects the type of control to be performed, such as load ramp regulation, generator ramp regulation, frequency regulation, providing supplemental reserve power and/or providing emergency power. Upon selection of the type of control, the control unit issues an active power dispatch command corresponding to the type of control selected to one or more of the network charging stations, where the command may be executed.

In particular, upon receiving the active power command from the centralized control unit, the local control unit within the charging station(s) controls the flow of electrical power to provide grid support. Specifically, upon receiving a command from the centralized control unit, the local control unit interrupts the charge profile of the connected battery in order to provide active power output (i.e., from the charging station to the distribution network).

In accordance with the above, the system of the invention, via the charging stations, performs control of active power output from one or more charging stations to a connected electrical grid, such as the power distribution system 312 within a working area. As discussed, the active power command may be calculated based on the actual type of control to be performed and the total number of batteries connected to the charging stations in the system.

In connection with the above, the system may provide for load ramp regulation and/or frequency regulation. With load ramp regulation, the ramp rate of the charging stations may be limited by the size of the batteries connected to the charging stations and their respective states of charge. By controlling the active power output from the charging stations, the charging stations may adequately meet the load, thereby allowing the main supply of electricity to a working area (such as from a main power grid or local power generating sources for a microgrid) to ramp up at less stressful rates. Similarly, turning off a large electric load results in a negative step, causing the main power source to ramp down. In an embodiment, the charging stations can be utilized to prevent such frequent step changes in system loading, thereby extending the operating life of the electric supply equipment.

With respect to generator ramp regulation, whenever there may be a change in the load power, the onsite generators may modify their output power to match the change. The generators, however, may not be able to meet this change due to many factors like current operating point, loss of one or more generators, generator inertia, design limitations, etc. In an embodiment, the control unit, to the extent of available capacity of the connected batteries, can augment the generators in meeting these load changes. The control unit can continuously perform this operation to prevent the generators from constantly changing their output set points, allowing them to be operated more efficiently.

Suitable generators may include an internal combustion engine (ICE). The ICE may operate via one fuel, or a combination of different fuels as a mixture, and in different proportions relative to each other to form a substitution ratio of one fuel relative to another. These fuels may have relatively different amounts of carbon and suitable fuels may include one or more of gasoline, diesel, hydrogenation-derived renewable diesel (HDRD), alcohol(s), ethers, ammonia, biodiesels, hydrogen, natural gas, kerosene, syngas, dimethyl ether, and the like. The plurality of fuels may include gaseous fuels and liquid fuels, alone or in combination. In one embodiment, the substitution ratio may correspond to an injection amount of a fuel with a relatively lower carbon content or zero carbon content (e.g., hydrogen gas or ammonia). As the substitution ratio increases, the relative proportion of fuel with the lower or zero carbon content increases and the overall amount of carbon content in the combined fuel lowers. In one embodiment, the generator is a fuel cell. Suitable fuel cells may consume hydrogen and/or natural gas.

With respect to supplemental reserve power, in order to account for load variability and outage of electric supply equipment (therefore improved reliability), a certain amount of head room may be kept. The headroom may be accommodated by onsite generators and electrical equipment capacities. Such reserves or margins can be reduced by the amount of available capacity of energy storage for the batteries connected to the charging stations.

With respect to emergency power, in an embodiment, in the event of a partial or complete grid outage, the control unit can be used to provide emergency power that can be used for starting up on-site generators and to keep operational loads running.

Moreover, one other unique feature of mining machinery loads may be that there may be a significant portion of regeneration in their duty cycle resulting in back-feeding of electrical energy from the machinery into the power distribution grid. In an embodiment, the charging stations may be utilized to regulate these back-feeds by absorbing the excessive real power into the connected batteries. By compensating for step changes in the load through the charging/discharging of the batteries connected to the respective charging stations, the net effect of these load changes on the utility grid (either local power distribution grid or main supply grid) or microgrid assets may be greatly minimized and substantially eliminated.

In addition, while frequency regulation may not be performed for a distribution grid without an isochronous local generation, the charging stations of the system can assist the microgrid in this operational aspect by charging or discharging the connected batteries in response to the changes in load, thereby regulating the grid frequency and keeping it within acceptable limits. This may help in operating local generating equipment more efficiently by allowing them to operate at their optimum point, instead of the less efficient load following operation mode.

An embodiment may use the batteries connected to network charging stations for power grid support and, in particular, for frequency support on the grid, as well as to support the ramp rates of mining machinery. As a result, the system minimizes wear and tear on the power generation assets due to steep ramp rates imposed by large step changes that may be commonly encountered in a mining power distribution system. By utilizing the existing battery charging stations in working areas that operate electric vehicles, the existing vulnerabilities of the mining distribution grid resulting from load variations, step changes, power back-feeding and the like, can be reduced or eliminated.

In an embodiment, the system may use a group of network charging stations (and their associated connected batteries) to buffer against rapid charging of other energy storage equipment). If necessary, additional batteries can be installed at the charging stations to support this function.

In an embodiment, in addition to active power control, the system 300 may also be configured to provide reactive power to the power distribution grid. In particular, with reference to FIG. 7, the control unit 328 may be additionally configured as shown therein to provide reactive power. In connection with this, the control unit 328 may additionally, or alternatively, include a voltage/reactive power assessment block 354, a reactive capacity assessment block 356, and a dispatch block 358.

In connection with this embodiment, the control unit 328, through the voltage/reactive power assessment block 354, is configured to determine the voltage and/or reactive power present in the distribution lines of the power distribution grid 312 at any given time. In particular, the control unit 328 is configured to conduct a real-time voltage and reactive power assessment for the distribution grid 312 in dependence upon a plurality of reactive power parameters. As used herein, "real time" refers to the monitoring and assessment of distribution system parameters during operation, for any particular moment in time, wherein the assessment has a latency generally within acceptable norms for the electrical system in question, in that any perceptible difference between actual and assessed parameters are minimal and tolerated. In an embodiment, the reactive power parameters may include one or more of a measured voltage, current, and/or power of the electrical supply from the power source 310 to the distribution grid 312 (as well as within the distribution 312), historical data, and a network model. In an embodiment, historical data may be the instantaneous values of voltage, current, frequency, and power of individual electric machines including, but not limited to, generators or loads, or of aggregated measurements at common measurement points such as feeder heads or junction boxes, or any other point in the power distribution network. In an embodiment, the historical data and network model may be representative of the number and size of actual and expected electrical loads within the mine (or other facility or other location), and may include data relating to the actual and expected voltages across the distribution cables and/or actual and anticipated voltage fluctuations. In another embodiment, the historical data, by itself or in combination with the network model, can be used to forecast future operating conditions that are taken into account for determining the reactive power dispatch.

The control unit 328, through the capacity assessment block 356, is also configured to determine the capacity of the network charging stations 316, 318, 320 to provide reactive power support to the power distribution network 312. (Reactive power support may include providing reactive power and/or receiving/absorbing reactive power.) In particular, the control unit 328 is configured to determine the capacity of the charging stations to provide reactive power support in dependence upon a plurality of reactive capacity assessment parameters and/or information received from each of the charging stations 316, 318, 320. In an embodiment, the reactive capacity assessment parameters may include information and data relating to the charging profiles of each of the batteries 322, 324, 326 (and their associated electric vehicles) connected to the charging stations 316, 318, 320, respectively, load cycle profiles, and generating equipment and power supply asset information.

Figure 7:
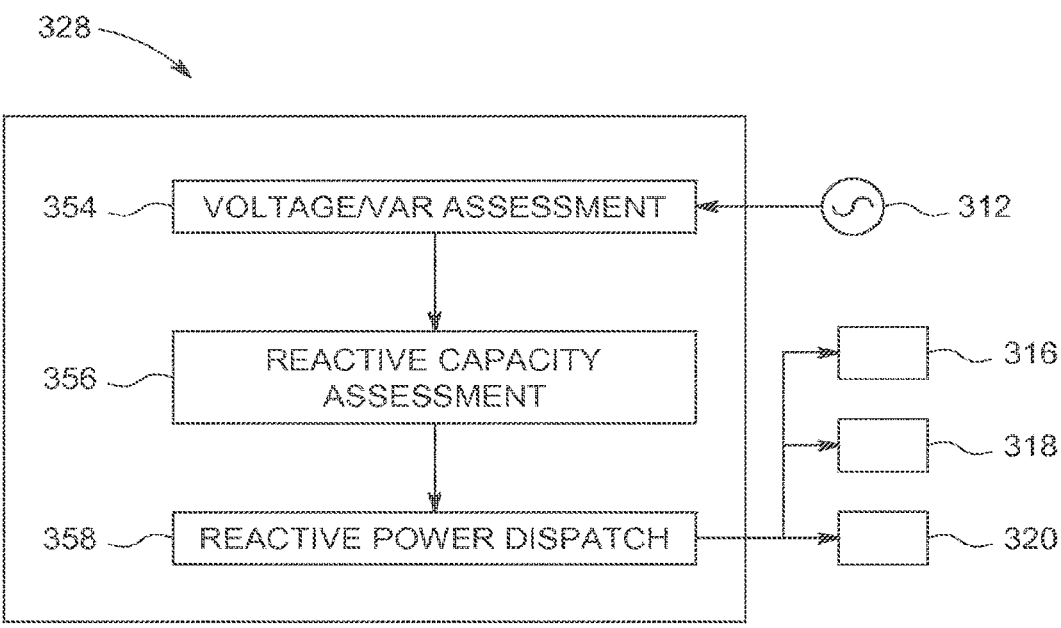
FIG. 7 is a block diagram of the control unit of the system of FIG. 4, illustrating additional control architecture thereof for providing reactive power, according to an embodiment of the invention.

With further reference to FIG. 7, the control unit 328, through the reactive power dispatch block 358, is configured to issue control signals to one or more of the charging stations 316, 318, 320 to provide reactive power support. In an embodiment, the control signals include a reactive power set point that is communicated to the local control unit(s) 342 of one or more of the charging stations 316, 318, 320. In an embodiment, the reactive power set point corresponds to, or is otherwise calculated in dependence upon, a desired terminal voltage on the power distribution grid 312. As will be readily appreciated, it is not required that a battery be connected to the charging stations 316, 318, 320 in order for the stations to provide reactive power to the power distribution network.

In operation, in order to provide reactive power to the power distribution grid, the control unit 328 first conducts a real-time reactive power assessment for the power distribution grid 312 in dependence upon one or more of voltage, power, and/or current measurements of the electrical supply from the power source 310 to the distribution grid 312, historical load data for the network 312, and a network model. The control unit 328 then determines the capacity of the network charging stations 316, 318, 320 to provide reactive power in dependence upon the charging profiles of any connected batteries 322, 324, 326, load cycle profiles, and generation asset information. Once capacity has been determined, the control unit 328 issues control signals that include a reactive power dispatch command corresponding to the amount of reactive power needed to one or more of the network charging stations 316, 318, 320, where the command is executed. In an embodiment, the reactive power command is calculated in dependence upon one of a measurement at the point of load, anticipated reactive power demand, increased load demand, and/or power factor improvement for a generator. In an embodiment, the measurement may be a voltage measurement, but the present invention is not intended to be so limited in this regard and may include any other type of measurement such as a power, current, or frequency measurement.

Upon receiving the reactive power command from the control unit 328 (centralized or otherwise), the local control unit(s) 342 within the charging station(s) controls the flow of reactive power from the charging stations to the distribution grid 312 and, ultimately, to any electric machinery connected to the grid 312. Specifically, upon receiving a command from the control unit 328, the local control unit 342 initiates reactive power output from the charging station(s) in accordance with the determined set-point in order to optimize or otherwise control the reactive power flow to the electric machines.

In accordance with the above, the system 300, via the charging stations 316, 318, 320, may be configured to perform voltage control through control of reactive power output from one or more charging stations to a connected electrical grid, such as the power distribution system 312 within a mine or other facility. As discussed, in embodiments, the reactive power command of the control unit 328 is calculated based on a desired terminal voltage on the power distribution grid 312.

Additionally, the system 300 of the present invention, via the charging stations, may be configured to provide for voltage/reactive power management in order to optimize the reactive power (i.e., VAR) to the electrical mining machinery (or other electric machinery) within the mine (or other location). In an embodiment, irrespective of whether a battery is connected to the charging stations or not, the charging stations can assist in voltage regulation by absorbing or supplying reactive power as necessary. As will be readily appreciated, the amount of reactive power each charging station can supply is only limited by the size of the converter (e.g., inverter) within the charging station. In addition to regulating voltage at the point of load, in an embodiment, the charging stations can also be utilized to compensate for voltage sags caused by step changes in load as electrical loads are turned on and off.

By maintaining minimum acceptable voltages at the point of load by supplying reactive power from the charging stations, motor productivity and life may be extended beyond what is capable with existing systems. By extending motor life, the life and productivity of the machinery, as a whole, may be increased. In addition, by maintaining adequate voltage for the electric mining machinery operating within a mine or other facility, the physical extent of the mine or other facility may be expanded in excess of what has heretofore been possible (as power can be delivered further than has heretofore been possible as a result of the supplement of reactive power from the charging stations). Advantageously, the system of embodiments of the invention utilizes energy storage charging stations that may already be present in mine installations or other facilities (for mines or other facilities that operate electric vehicles), obviating the need to install any additional systems or hardware.

While the control unit 328 of the system 300 has been described above as containing the control architecture illustrated in both FIGS. 6 and 7 for selectively providing both active power control and reactive power, in certain embodiments, the control unit 328 may have either the architecture illustrated in FIG. 6 for providing active power control, or the architecture in FIG. 7 for providing reactive power. In other embodiments, the system may have separate control units for providing active power and reactive power control, respectively.

Figure 8:
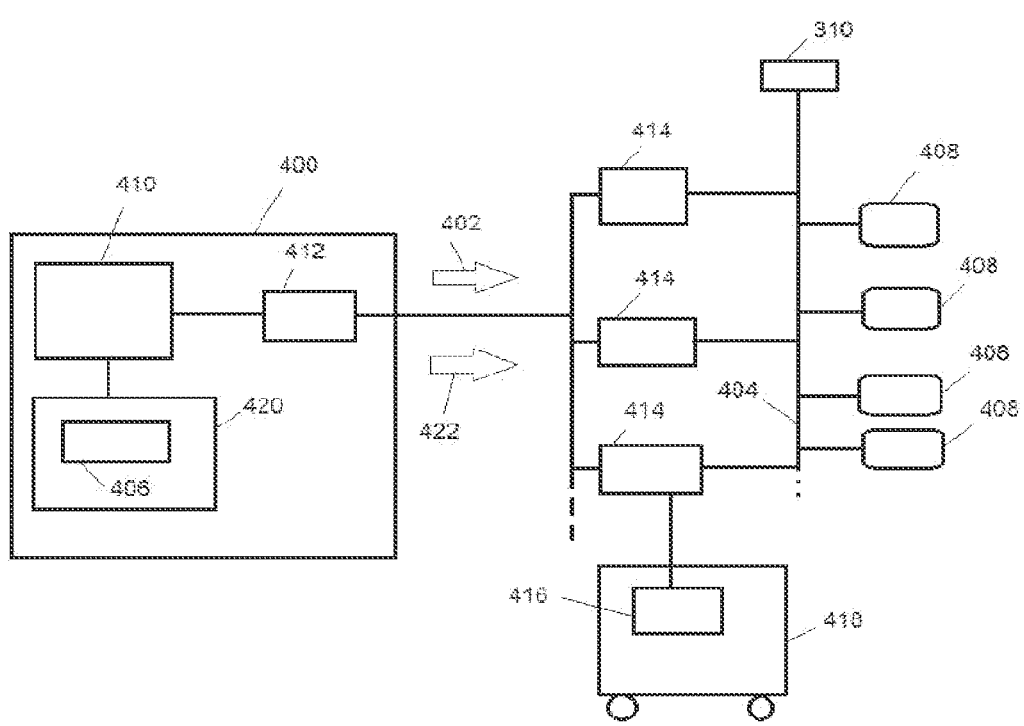
FIG. 8 is a block diagram of another embodiment of a control unit and system.

Alternatively or additionally to controlling charging stations based on real-time load assessments, in embodiments, with reference to FIG. 8, a control unit 400 is configured to generate control signals 402 for active and/or reactive power support of a power distribution grid 404, based on a load cycle profile 406 of one or more electric machines 408 electrically coupled to the power distribution grid. The control unit includes one or more processors 410 and a communication interface 412 operably coupled to the processor. The communication interface is configured to communicate with one or more charging stations 414 electrically coupled to receive electrical power from a power distribution grid. The charging stations are configured to selectively charge one or more energy storage devices 416 connected to the one or more charging stations. For example, the energy storage devices may be batteries that are disposed in, or configured to be disposed in, electric vehicles 418. The load cycle profile 406 may be stored in a memory unit 420 associated with the processor. The control unit 400 may additionally or alternatively include components such as shown in and described in connection with FIGS. 1, 6, and 7.

In an embodiment, the load cycle profile 406 includes first information of one or more times (time of day, and/or time period or duration) when the one or more electric machines are scheduled to draw electrical power from the power distribution grid and one or more magnitudes of the electrical power to be drawn by the one or more electric machines from the power distribution grid at the one or more times. For example, the load cycle profile may indicate that a first electric machine is scheduled to commence operation at a given time of day, to draw 10 megawatts of power for a transient time period, and then draw 1 megawatt for a steady state operational time period. Other electric machines may be similarly characterized in the load cycle profile. Based at least in part on this information (e.g., real-time load assessment data may also be factored in), the processor 410 of the control unit 400 is configured to generate the first control signals 402 for communication by the communication interface to the one or more charging stations to control transfer of at least one of reactive power or active power from the one or more charging stations to the power distribution grid 404. For example, for a given time of day and expected power magnitude and duration, the control unit may generate the control signals to control the charging stations, ahead of the time, to suspend electric vehicle charging operations (including possibly controlling or scheduling the vehicles not to detach from the charging stations) and, at the given time of day, commence with transferring power to the grid for all or part of the duration. (It may be the case, for example, that the control unit controls the charging stations to transfer power to the power distribution grid only for power draw transients that exceed a designated threshold, and not for steady state operations that can be stably accommodated by the power supply.)

In embodiments, the electric machines 408 are not charging stations, that is, they are not configured to process electrical power for charging the energy storage devices of electric vehicles or other machines. This reflects that the control unit 400 is configured to control grid support not only in situations where charging stations and similar relatively small/stable loads are connected to the grid, but also in situations where relatively large, discrete electric machines, with large power draws and transients (e.g., for a given machine, 1 megawatts to 10 megawatts or more), are connected to the grid, such as may be the case in a mine or other industrial facility.

As noted, in certain operational modes, such electric machines may feed/transfer power back to the power distribution grid 404. Accordingly, in embodiments, additionally or alternatively, the load cycle profile 406 may include second information of one or more second times (e.g., time of day, and/or time periods or durations) when the one or more electric machines 408 are scheduled to transfer electrical power back to the power distribution grid and one or more magnitudes of the electrical power to be transferred back to the power distribution grid by the one or more electric machines at the one or more second times. The processor 410 of the control unit 400 is further configured to generate second control signals 422, based at least in part on the second information, for communication by the communication interface 412 to the one or more charging stations to control the one or more charging stations to charge the one or more energy storage devices 416 with electrical power drawn from the power distribution grid. For example, the control unit 400 may delay or schedule charging by the charging stations until a time when the electric machines 408 are expected/scheduled to feed power back to the grid.

In other embodiments, alternatively or additionally, the load cycle profile 406 includes information of how much power the one or more electric machines 408 are expected to draw from (or transfer back to) the power distribution grid when the one or more electric machines are operational. This may account for situations where it is unknown when an electric machine will commence operation. In particular, the control unit may be configured to detect or determine when an electric machine has become operational, or will become operational. This may be based on sensor data (e.g., generated by sensors operably associated with the electric machine), and/or on measurements of electrical signals present on grid supply lines connecting to the electric machine. For example, if an electrical signal on a grid supply line transitions from zero current to some non-zero current, this may be indicative of an electric machine commencing operation. Alternatively or additionally, the control unit may receive information that an electric machine has commenced operation, or will commence operation, such as from a controller that is on-board the electric machine. (For example, if machine operation is contingent upon the occurrence of certain events or conditions, the controller, upon determining that such events or conditions have occurred, may communicate with the control unit in addition to controlling the machine to commence operation.) In operation, the control unit will know from the load cycle profile how much power is expected to be drawn from the grid (or fed back to the grid) when a given machine is operational (i.e., expected power draw or feedback as a function of operating time), allowing the control unit to react accordingly, responsive to detecting that the machine has become or will become operational, or receiving information of the same. For example, for a given machine, if the load cycle profile indicates that upon commencing operation the machine will draw 1 megawatt for a given transient time period, when the control unit determines (or receives information) that the machine is commencing operation, the control unit generates the control signals 402 to control the charging stations 414 to transfer power from energy storage devices 416 coupled to the charging stations to the power distribution grid 404. The same is true for generating control signals 422 to support power transfer from the electric machines back to the power distribution grid. For example, if the load cycle profile indicates that upon commencing operation a given machine will operate for a given time period and then transfer 1 megawatt of power back to the grid upon shutting off at the end of the time period, when the control unit determines (or receives information) that the machine is commencing operation, the control unit sets a counter for the time period, and generates the control signals 422 to control the charging stations to commence energy storage device charging when, or ahead of when, the electric machine will transfer the power back to the grid.

In embodiments, the control unit is communicatively coupled with charging stations and/or electric machines by way of an Ethernet network or other local area data network.

Although embodiments are set forth herein characterizing control based on load cycle profiles of machines that draw electrical power in the order of from 1 to 10 megawatts each, this does not preclude load cycle profiles that additionally take into account loads less than this amount (i.e., loads both above and below 1 megawatt), or load cycle profiles that take into account only loads less than 1 megawatt. In some embodiments, at least some of the loads (machines) are 1 megawatt or more.

In an embodiment a system of active power control for an energy storage charging station may be provided. The system includes a power distribution grid providing a primary supply of electric power, a charging station electrically coupled to the power distribution grid and that may selectively charge an energy storage device connected to the charging station, and a control unit in communication with the charging station. The control unit may selectively control active power output from the charging station to the power distribution grid.

In an embodiment, the control unit may conduct a real-time load assessment in dependence upon voltage, current and power measurements of the primary supply of electric power. In an embodiment, the control unit may determine the capacity of the charging station to provide active power support to the power distribution grid in dependence upon one or more of a charging profile of the energy storage device, a status of the energy storage device, a load cycle profile and energy generation asset information.

In an embodiment, the control unit may select a type of active power control and to issue a command to the charging station to provide for the selected type of control. The type of active power control may be load ramp regulation, frequency regulation, generator ramp regulation, supplemental reserve power and/or emergency power. In an embodiment, the control unit may absorb excess electrical power from back-feeds into the energy storage device.

In an embodiment, the control unit may be housed locally within the charging station. In another embodiment, the charging station may be a plurality of charging stations, at least one of which includes a connected energy storage device, and the control unit may be a centralized control unit located remote from the charging stations. In an embodiment, the charging station includes a local control unit that may receive an active power command from the centralized control unit and to execute the command to provide active power support to the power distribution grid.

In an embodiment, the charging station includes a communications device that may establish a communications link with the energy storage device and with the centralized control unit, an interface for displaying an operational status of the charging station, and a buffering energy storage unit. The buffering energy storage unit may receive electrical energy from the power grid under control on the local control unit and to selectively release the stored electrical energy to the battery under control of the local control unit.

In an embodiment, the communications device, the local control unit and the buffering energy storage device of the charging station may be housed within an explosion-proof enclosure. In an embodiment, the energy storage device may be a battery of an electric mining vehicle. In an embodiment, the power distribution grid may be located within a working area installation. In another embodiment, a method of active power control for an energy storage charging station may be provided. The method includes the steps of conducting a real-time assessment of electrical loads on a power distribution grid, the power distribution grid being electrically coupled to the charging station, determining the capacity of the charging station to provide active power support to the power distribution grid, selecting a type of active power control to be carried out, and issuing an active power dispatch command to the charging station. In an embodiment, the step of conducting a real-time assessment of electrical loads includes assessing at least one of voltage, power, current and frequency measurements of a primary supply of electrical power and historical load data.

In an embodiment, the step of determining the capacity of the charging station to provide active power support includes assessing at least one of a charging profile of an energy storage device connected to the charging station, a status of the energy storage device, a load cycle profile and energy generation asset information. In an embodiment, the type of active power control includes one of load ramp regulation, frequency regulation, generator ramp regulation, supplemental reserve power and emergency power. In an embodiment, the charging station may be a plurality of coordinated charging stations at least one of the charging stations having a connected energy storage device. In an embodiment, the method may include the step of calculating the active power dispatch command in dependence upon the type of active power control selected and the number of energy storage devices connected to the charging stations. In an embodiment, the method steps may be carried out by a centralized control unit located remote from the charging station. In an embodiment, the steps may be carried out by a local control unit housed within the charging station.

In yet another embodiment, a charging station for an energy storage device may be provided. The charging station includes a control block that may control the distribution of electrical energy to the energy storage device, a communications block that may establish a communications link with the energy storage device of an electric vehicle to be charged, an interface, and a network communications device. In an embodiment, the communications block may facilitate the exchange of operational information between the charging station and the energy storage device. The operational information may include health monitoring data, uploads of operational system software/firmware, and/or logistics information related to vehicle performance within a working area In an embodiment, the communications block may identify the presence of a suitable vehicle or equipment and to assess a maximum current draw that can be provided through the charging station to a coupled vehicle. In an embodiment, the charging station may include an electrical switch. The electrical switch may transition between a first state in which AC electrical power may be prevented from flowing from the charging station to the connected energy storage device, and a second state, in which AC electrical power may be permitted to flow from the charging station to the connected energy storage device. In an embodiment, the interface includes an array of LEDs capable of conveying operating information and a charging status to a user. In an embodiment, the charging station includes a network communications device. The network communications device may provide a communications pathway between the charging station and a control unit located remote from the charging station. In an embodiment, the charging station includes a battery storage device that may receive electrical energy from an outside source and to selectively release the stored electrical energy to the energy storage device under control of the control block.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, "electrically connected," "electrical communication" and "electrically coupled" means that the referenced elements may be directly or indirectly connected such that an electrical current may flow from one to the other. The connection may include a direct conductive connection (i.e., without an intervening capacitive, inductive or active element), an inductive connection, a capacitive connection, and/or other suitable electrical connection. Intervening components may be present.

While the system and method of the invention is described and illustrated in connection with underground material transport vehicles, the system and method of the invention may be applicable to electric vehicles and other electrical machinery. This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
   one or more charging stations that are electrically coupled with a power distribution grid and that are configured to selectively couple with one or more energy storage devices; and
   a controller that is configured to:
      control transfer of electric power between the one or more charging stations, the one or more energy storage devices, and the power distribution grid; and
      determine an amount of reactive power to be in the electric power based at least in part on one or more assessment values.

2. The system of claim 1, wherein the one or more assessment values are one or more of a load assessment, capacity assessment, reactive capacity assessment, voltage assessment, and reactive power assessment.

3. The system of claim 2, wherein one of the one or more assessment values is a real-time reactive power assessment of the power distribution grid, and the electric power supplied to the power distribution grid is reactive power.

4. The system of claim 1, wherein the controller is further configured to generate one or more control signals based on both of i) a measured transfer time that one or more electric machines that are selectively couplable to the one or more charging stations are scheduled to transfer electrical power back to the power distribution grid, and ii) one or more transfer magnitudes of the electrical power to be transferred back to the power distribution grid from the electric machines.

5. The system of claim 4, wherein the controller is further configured to:
conduct a real-time load assessment of the power distribution grid based on at least one of a voltage measurement or a current measurement of the electrical power associated with the power distribution grid; and
generate the control signal further based on the load assessment.

6. The system of claim 4, wherein controller is further configured to:
determine a capacity of the one or more charging stations to transfer the electric power to the power distribution grid based at least in part on one or more charging profiles of the energy storage devices; and
generate the control signal further based on the capacity that is determined.

7. The system of claim 4, wherein each charging station includes a respective local control unit configured to receive the control signal from a centralized control unit and to control the transfer of the electric power to the power distribution grid based at least in part on the control signal.

8. The system of claim 1, wherein one or more assessment values are one or more of a load assessment, capacity assessment, reactive capacity assessment, voltage assessment, and reactive power assessment; and the controller is further configured to determine the amount of reactive power to be transferred to or from the power distribution grid and the energy storage device based at least in part the one or more assessment values.

9. The system of claim 8, wherein one of the one or more assessment values is a real-time reactive power assessment of an electric vehicle having one or more traction motors, and that includes the one or more energy storage device, and the controller is further configured to determine the amount of reactive power to be transferred from the power distribution grid to the energy storage device based at least in part the one or more assessment values.

10. The system of claim 1, wherein one or more assessment values are one or more of a load assessment, capacity assessment, reactive capacity assessment, voltage assessment, and reactive power assessment, and the controller is further configured to provide reactive power support to the power distribution grid based at least in part the one or more assessment values.

11. The system of claim 1, wherein the controller is further configured switch between a first mode and a second mode, and in the first mode the controller causes at least one of the charging stations to supply active power to the power distribution grid, and in the second mode the controller causes at least one of the charging stations to provide reactive power to the power distribution grid, a mode determination of the controller being responsive to at least the one or more assessment values.

* * * * *